United States Patent [19]

Matsukiyo et al.

[11] Patent Number: 5,363,013
[45] Date of Patent: Nov. 8, 1994

[54] PHOSPHOR AND CATHODE-RAY TUBE USING THE SAME

[75] Inventors: Hidetsugu Matsukiyo, Koganei; Teruki Suzuki, Funabashi; Hajime Yamamoto, Tokyo; Yasuhiko Uehara, Chiba; Yasukazu Morita, Mobara; Yoshihiro Koseki, Chiba; Hiromichi Yamada, Hino; Shigeo Fujino, Odawara; Takashi Hase, Ebina; Tsutomu Yamada, Minamiashigara; Susumu Omatoi, Fujisawa, all of Japan

[73] Assignees: Hitachi Ltd.; Kasei Optonix Ltd., Tokyo, Japan

[21] Appl. No.: 957,594

[22] Filed: Oct. 6, 1992

Related U.S. Application Data

[62] Division of Ser. No. 444,961, Dec. 4, 1989, Pat. No. 5,177,401.

[30] Foreign Application Priority Data

Dec. 5, 1988 [JP] Japan ................. 63-305931

[51] Int. Cl.$^5$ ............................. H01J 29/20
[52] U.S. Cl. ................. 313/468; 252/301.4 F
[58] Field of Search ............. 252/301.4 F; 313/468

[56] References Cited

U.S. PATENT DOCUMENTS

| | | | |
|---|---|---|---|
| 3,523,091 | 4/1970 | McAllister | 252/301.4 F |
| 3,634,711 | 1/1972 | Barber et al. | 252/301.4 F |
| 3,758,413 | 9/1973 | Peters | 252/301.4 F |
| 4,894,583 | 1/1990 | Berkstresser et al. | 252/301.4 F |

FOREIGN PATENT DOCUMENTS

| | | | |
|---|---|---|---|
| 60-13882 | 1/1985 | Japan | 252/301.4 F |
| 62-260885 | 11/1987 | Japan | 252/301.4 F |

*Primary Examiner*—Jack Cooper
*Attorney, Agent, or Firm*—Fay, Sharpe, Beall, Fagan, Minnich & McKee

[57] ABSTRACT

Disclosed are terbium-activated oxide phosphors having incorporated, at least one of ytterbium, thulium, samarium and europium. Incorporation of the element(s) has made it possible to produce phosphors exhibiting high brightness and suffering little brightness deterioration under high-density electron bombardment.

4 Claims, 4 Drawing Sheets

PHOSPHOR AND CATHODE-RAY TUBE USING THE SAME

This is a divisional application of U.S. Ser. No. 444,961 filed on Dec. 4, 1989, now U.S. Pat. No. 5,177,401.

BACKGROUND OF THE INVENTION

This invention relates to green-emitting phosphors suitable for high-density electron bombardment and a cathode-ray tube using these phosphors. The density of electric current used in projection cathode-ray tubes is more than 100 times as large as that of electric current used in direct-view tubes. For this reason, phosphors used in the projection tubes are not only required to have high emission efficiency but also required to have excellent current and temperature characteristics of brightness and cause little change of brightness with irradiation time even in high-density electron bombardment.

In particular, it is desired that green-emitting phosphors, which contribute to white brightness of a screen the best, have excellent emission characteristics. Under these circumstances, many manufacturers are trying to improve phosphors and studying various materials, particularly, for green color, as is described in Proceedings of the 217th Meeting of Phosphor Research Society; Phosphors for projection tubes, pp. 19~26 (1987).

For example, Japanese Patent Kokai (Laid-Open) No. 37670/1973, U.S. Pat. No. 3,758,413, etc., disclose a phosphor having a composition of $Y_2SiO_5$: Tb.

Japanese Patent Kokai (Laid-Open) No. 101175/1985 discloses a phosphor having a composition of $Y_3(Al_{1-x}Ga_x)_5O_{12}$: Tb (wherein $0 \leq x \leq 1$). This phosphor has current characteristics of brightness that brightness increases generally in proportion to a current density at a low current density (of not more than 10 $\mu A/cm^2$) and excellent temperature characteristics of brightness that brightness changes little against a temperature change of the phosphor. Thus, this phosphor has high emission efficiency. However, the problem of this phosphor is that at a high current density (of more than 10 $\mu A/cm^2$), brightness does not increase in proportion to a current density but nearly shows a saturation tendency. The "current density" above stands for a value obtained by dividing an electron beam current by a raster area. Further, U.S. Pat. No. 3,666,676 discloses a phosphor represented by general formula $M_{1-x-y}OX$: $Tb_xYb_y$ wherein M denotes an element selected from a group consisting of La and Gd, and X denotes an element selected from a group consisting of Cl and Br. The above U.S. Patent describes that afterglow in a unit of second, observed after X-ray excitation, is decreased by adding Yb. However, all of the above conventional green-emitting phosphors are colored under high-density electron bombardment and cause problems of deterioration of emission efficiency and brightness with irradiation time (so-called aging). For example, according to an experiment of the present inventors, when the ratio of brightness after electron bombardment to initial brightness (referred to as brightness maintenance factor) in relatively stable $Y_3Al_5O_{12}$: Tb is 0.95, that in LaOCl: Tb, Yb is 0.5 to 0.6. In order to make green-emitting phosphors usable practically in a projection cathode-ray tube, therefore, first of all, brightness deterioration due to electron beam irradiation needs to be prevented, and further, it is necessary to prevent brightness saturation and maintain high emission efficiency even under high current density.

As for codoping of Tb with Eu, and Japanese Patent Kokai (Laid-Open) No. 105075/1984 and U.S. Pat. No. 3,394,048 disclose an orange-emitting phosphor having a composition of $InBO_3$ in which Eu and Tb are coactivated.

SUMMARY OF THE INVENTION

It is an object of this invention to provide a phosphor which is free from brightness deterioration and further, which is free from brightness saturation and has high emission efficiency, and a cathode-ray tube using same.

The above object is achieved by incorporating into a Tb-activated oxide phosphor at least one selected from a group consisting of samarium (Sm), europium (Eu), thulium (Tm) and ytterbium (Yb).

DETAILED DESCRIPTION OF THE PREFERRED EMBODIMENTS

Incorporation of a very small amount of trivalent element(s) has been studied in order to prevent brightness deterioration of Tb-activated green phosphors whose hosts are oxides.

As a result, it has been found that incorporation of at least one of Sm, Eu, Tm and Yb is effective to prevent brightness deterioration. It is further found that this element incorporation improves efficiency of the phosphors by several to several decades in percentage, and further, it also improves dependence of emission efficiency on electric current.

The foregoing does not mean that the incorporation of these elements has such effects on all of Tb-activated phosphors, and for example, no effect is exhibited on oxysulfides such as $Y_2O_2S$:Tb. As a result of a detailed study, it has been found that suitable examples of the Tb-activated phosphors are materials whose hosts are oxides such as $(Y_{1-x}Tb_x)_3(Al_{1-z}Ga_z)_5O_{12}$ ($1 \times 10^{-2} \leq x \leq 0.20$, $0 \leq z \leq 1$), $(Y_{1-x-z}Gd_zTb_x)_2SiO_5$ ($0.05 \leq x \leq 0.15$, $0 \leq z \leq 0.45$), $In_{1-x}Tb_xBO_3$ ($1 \times 10^{-4} \leq x \leq 0.04$), etc. In particular, the effects have been remarkable on $(Y_{1-x}Tb_x)_3(Al_{1-z}Ga_z)_5O_{12}$ ($0.04 \leq x \leq 0.14$, $0.1 \leq z \leq 0.6$). The effects of incorporated elements are recognized even in a low concentration of about 1 ppm in a molar ratio, and with an increase in concentration, emission efficiency is degraded due to an interaction between incorporated elements and Tb, and color tone is deteriorated due to emission of incorporated elements. Hence, there is a particularly desirable range of element concentration. The upper limit of the concentration depends on phosphors and elements. Among the elements to be incorporated, emission of $Yb^{3+}$ occurs in a near infrared region, and hence does not mar emitted color of $Tb^{3+}$. Thus Yb can be incorporated up to a concentration of as high as about $2 \times 10^4$ ppm in molar ratio. In contrast, since emission of $Eu^{3+}$ occurs in a red region, and since its emission efficiency is high, Eu causes difficulty even in a low concentration. The upper limit of the Eu concentration has been $3 \times 10^2$ ppm in molar ratio. $Sm^{3+}$ also emits red color. Since however, its emission efficiency is lower than that of $Eu^{3+}$, the upper limit of its concentration is higher or about $1 \times 10^3$ ppm in molar ratio.

$Tm^{3+}$ which exhibits emission of blue and red colors has low emission efficiency, and it does not mar the emitted color of $Tb^{3+}$ before its concentration reaches about $1 \times 10^3$ ppm in molar ratio.

In general, any light color can be color-matched by forming an additive mixture of specific lights of three colors in suitable proportions. On the basis of this principle, the color of a light source can be represented by using intensity ratio of primary colors, and an XYZ color specification system, in which the intensity ratio is coordinate-transformed for ease in use, is often used. This system uses chromaticity coordinates, X and Y, (Optical Engineering Handbook, Asakura Publishing Co. edited by Ose et al., 1986, pages 113–128) to denote colors. Among Tb-activated green-emitting phosphors, $In_{1-y}Tb_yBO_3$ emits a color which is comparatively similar to pure green color and typically represented by chromaticity coordinates where $X=0.325$ and $Y=0.625$. Other Tb-activated phosphors being practically used emit yellowish green colors mostly in the vicinity of $X=0.33\sim0.34$ and $Y=0.56$. The chromaticity coordinates are existent desirably as mentioned here or near to green color, i.e. in the direction where X is smaller and Y is larger. The limit near to the yellow color side is represented by chromaticity coordinates where $X=0.36$ and $Y=0.54$, similar to the above values. On the basis of this standard, in a shift of chromaticity coordinates of $In_{1-x-y}Tb_xEu_yBO_3$, caused by addition of $Eu^{3+}$ emission, it is desirable that X does not exceed 0.34 and Y does not exceed 0.56, i.e. the shift is within about 5% change for X and about 10% change for Y. And it is required that X should not exceed 0.36 and Y should not exceed 0.54, i.e. the shift should not exceed an 11% change for X and a 14% change for Y.

Concerning other Tb-activated phosphors, allowable shifts for X and Y are smaller, and their limits are about 10% for X and 5% for Y.

In synthesis of a phosphor represented by general formula $(Y_{1-x-y-z}Gd_xTb_yM_z)_2SiO_5$, the use, as a flux, of suitable alkali halide such as bromide or chloride of Na or K or NaI gives a phosphor having high brightness. In general formula, M represents at least one element selected from a group consisting of Yb, Tm, Sm and Eu. The amount of the flux per mole of the above phosphor is preferably in the range of from 0.05 to 0.4 mole. The firing temperature is preferably in the range of from 1,250° to 1,800° C. In addition, part of Y or Gd may be replaced with Sc, and part of Si may be replaced with Ge. A part of Y may be replaced by Gd.

The elements usable for the incorporation in this invention have a common characteristic in that they have a smaller third ionization potential than host-constituting cations, i.e. Y and Gd. As a result, the incorporated elements are able to capture an electron when they are substituted for host-constituting elements. This is considered to have some relation to prevention of aging and brightness saturation. It is also considered that oxygen vacancy has the ability to capture an electron and can form color centers. One assumption is that as a result of competition of the above incorporated element with the oxygen vacancy for an electron, formation of color centers is possibly prevented to reduce the aging.

Some possibility other than the above can be taken into account concerning $(Y_{1-x}Tb_x)_3(Al_{1-z}Ga_z)_5O_{12}$. It is known that Ga is usually in a trivalent state, and can be monovalent partly to cause oxygen vacancies. The oxygen defect is considered to be a factor for a change of brightness with time. This point is also easily understood from the fact that a Ga-free phosphor, $(Y_{1-x}Tb_x)_3Al_5O_{12}$, has greater strength against high-density element bombardment than phosphor having Ga introduced into their crystals when degrees of change of brightness with time are compared between these phosphors. Meanwhile, when an element which is usually trivalent, e.g. Yb, is introduced into crystals, there is a tendency that while Yb changes its state from trivalence to divalence, Ga maintains its trivalent state to prevent formation of oxygen vacancies. The same is also considered to be true of Sm, Eu and Tm. As a result, there are formed phosphors in which the change of brightness with time against high-density electron bombardment is small. Further, the oxygen vacancy is one of the factors for decreasing emission efficiency of phosphors, and reduction of oxygen vacancy concentration is effective to improve efficiency of phosphors and improve dependence of emission efficiency of electric current.

Cathode-ray tubes using at least one of the above phosphors are usable as heavy-duty cathode-ray tubes in which the current density (value obtained by dividing an electron beam current by a raster area) exceeds 10 $\mu A/cm^2$.

EXAMPLES

This invention will be illustrated with reference to Examples hereinbelow.

Examples 1~8

In each example, predetermined amounts of $Y_2O_3$, $Al_2O_3$ and $Tb_4O_7$ were weighed out such that their molar ratio was 0.93: 1,667: 0,035. And a predetermined amount of a $Yb_2SO_4)_3$ aqueous solution was added thereto, and these were wet-mixed in an agate mortar. When mixing, 10 wt.% of $BaF_2$ as a flux was added. The mixture was dried, then put into an alumina crucible, and fired in air at 1,500° C. for about 2 hours to give a white powder. The white powder was put into a beaker, washed with a 1N nitric acid aqueous solution twice, then washed with ion-exchanged water twice, and dried at 140° C. to give a $(Y_{1-x-y}Tb_xYb_y)_3Al_5O_{12}$ phosphor.

The phosphor obtained in each Example was applied on a stainless steel holder with a film thickness of about 6 mg/cm$^2$ by aggregation precipitation using potassium silicate. The phosphor film obtained above was set at an electron beam irradiation device, and irradiated with an electron beam having an acceleration voltage of 20 kV and a current of 100 $\mu A$ at a raster of $10 \times 10$ mm$^2$ (current density:100 μA/cm²) for 10 minutes to examine degrees of brightness deterioration of the phosphor film. Exployed as a measure of brightness deterioration was the ratio of an emission output after the 10 minutes' irradiation to an initial emission output (brightness maintenance factor). At the same time, a brightness value at the irradiation start time was measured.

Figure 1:
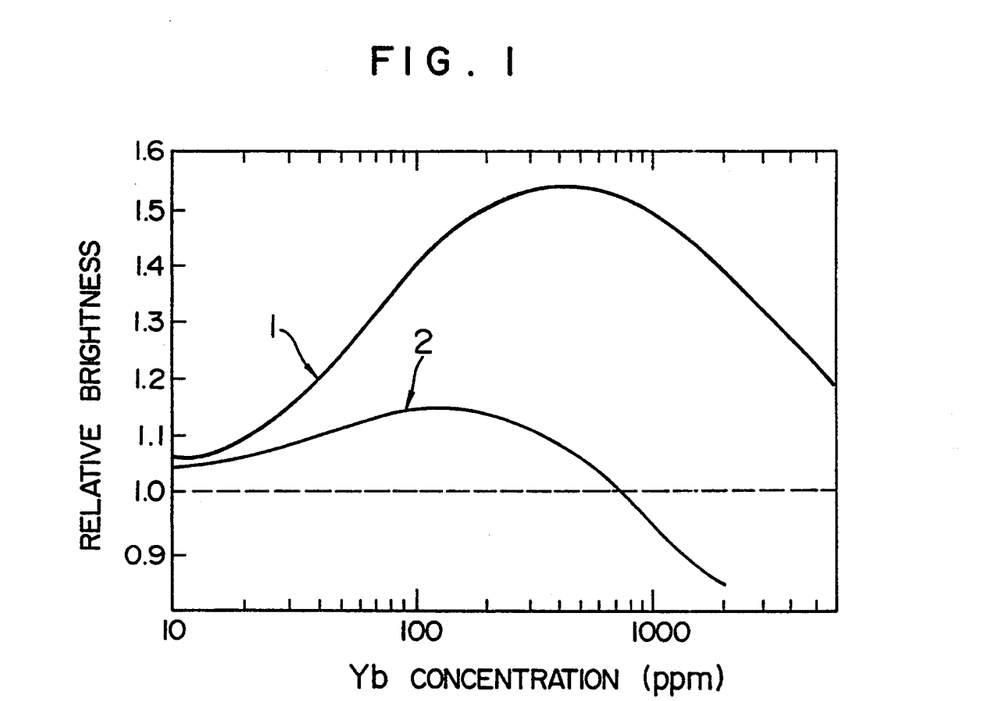
FIG. 1 shows dependence of brightness of a $(Y_{1-x-y}Tb_xYb_y)_3Al_5O_{12}$ phosphor on Yb concentration.
Figure 2:
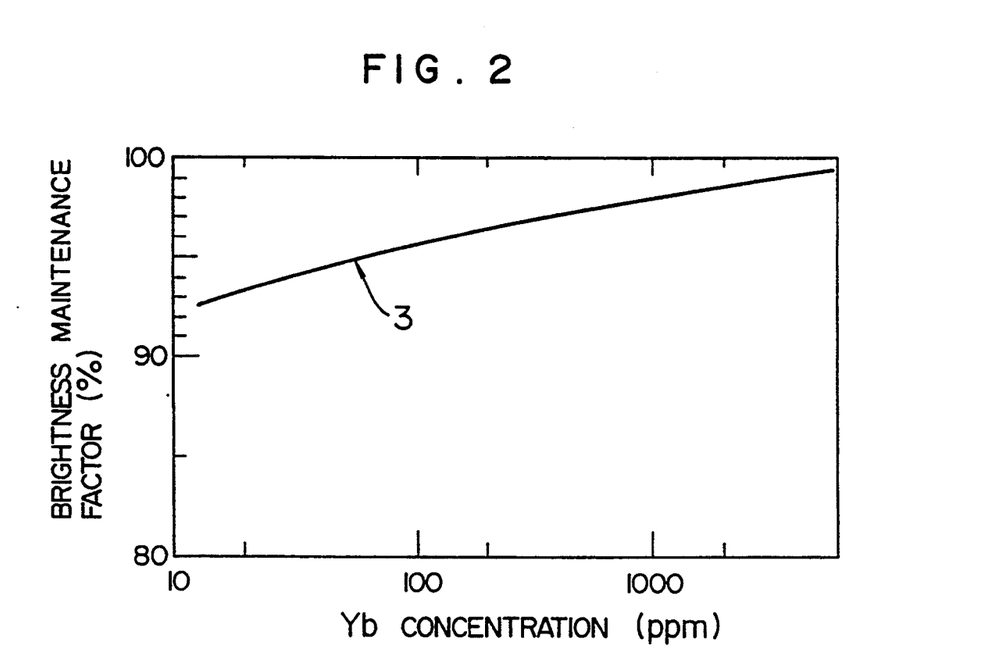
FIG. 2 shows dependence of brightness maintenance factor of said phosphor on Yb concentration.

Samples containing no Yb were also examined for comparison. Table 1 and FIGS. 1 and 2 show the results. In FIG. 1, curve 1 indicates brightnesses measured at an electron beam current of 100 μA, (current density: 100 μA/cm²) and curve 2 indicates brightnesses measured at an electron beam current of 10 μA. (current density:10 μA/cm²) In FIG. 2, curve 3 indicates data for brightness maintenance factors. As is clear from these results, it was possible to produce phosphors having a high brightness in a high electric current region and a high brightness maintenance factor (in which brightness deterioration hardly takes place) by adjusting the amount of Yb into the range of from 1 ppm to $2\times10^4$ ppm ($1\times10^{-6} \leq y \leq 2\times10^{-2}$) in molar ratio. In a low electric current region, the effect of Yb is low. And when the concentration of Yb is high, the brightness is rather degraded. The Yb concentration in molar ratio is preferably $10 \sim 10^3$ ppm, and particularly preferably $50 \sim 5\times10^2$ ppm. A brightness at a practically usable level can be obtained when the Tb concentration is in the range of from $10^4$ to $2\times10^5$ ppm ($1\times10^{-2} \leq x \leq 0.20$), and in particular, a good brightness can be obtained when the Tb concentration is in the range of from $4\times10^4$ to $1.4\times10^5$ ppm ($0.40 \leq x \leq 0.14$).

Examples 9~19

In each Example, predetermined amounts of $Y_2O_3$, $Al_2O_3$, $Ga_2O_3$ and $Tb_4O_7$ were weighed out, a predetermined amount of a $Yb_2(SO_4)_3$ aqueous solution was added thereto, and these were wet-mixed in an agate mortar. The molar ratio of $Y_2O_3$, $Al_2O_3$, $Ga_2O_3$ and $Tb_4O_7$ was 0.93: 1.111: 0.556: 0.035. The same synthesis method as that described in Examples 1 to 8 was repeated to give a green-emitting phosphor represented by general formula of $(Y_{1-x-y}Tb_xYb_y)_3(Al_{1-z}Ga_z)_5O_{12}$. The properties of the phosphor obtained in each of the Examples were evaluated under the same conditions as those of Examples 1 to 8. A sample containing no Ga and a sample containing no Yb were also examined for comparison. Table 2 shows the results.

TABLE 1

Comparison of brightness deterioration and brightness of $(Y_{1-x-y}Tb_xTb_y)_3Al_5O_{12}$

| Example | Yb concentration | Brightness maintenance factor | Relative brightness* |
|---|---|---|---|
|  | Not incorporated | 0.92 | 1 |
| 1 | 1 ppm | 0.92 | 1.01 |
| 2 | 5 ppm | 0.93 | 1.04 |
| 3 | 9 ppm | 0.93 | 1.06 |
| 4 | 20 ppm | 0.94 | 1.10 |
| 5 | 100 ppm | 0.96 | 1.41 |
| 6 | 500 ppm | 0.97 | 1.54 |
| 7 | $10^3$ ppm | 0.99 | 1.49 |
| 8 | $1 \times 10^4$ ppm | 0.99 | 1.03 |

*Relative brightness: At an acceleration voltage of 20 kV and a current of 100 μA. Brightness of a phosphor containing no Yb is taken as 1.

TABLE 2

Comparison of brightness deterioration and brightness of $(Y_{1-x-y}Tb_xYb_y)_3(Al_{1-z}Ga_z)_5O_{12}$

| Example | Composition Al/(Al + Ga) | Yb concentration | Brightness maintenance factor | Relative brightness* |
|---|---|---|---|---|
|  | 0.67 | Not incorporated | 0.90 | 1 |
| 9 | 0.67 | 0.1 ppm | 0.90 | 0.996 |
| 10 | 0.67 | 1 ppm | 0.90 | 1.00 |
| 11 | 0.67 | 5 ppm | 0.91 | 1.02 |
| 12 | 0.67 | 10 ppm | 0.92 | 1.04 |
| 13 | 0.67 | 20 ppm | 0.92 | 1.10 |
| 14 | 0.67 | 50 ppm | 0.93 | 1.21 |
| 15 | 0.67 | 100 ppm | 0.95 | 1.24 |
| 16 | 0.67 | 500 ppm | 0.97 | 1.29 |
| 17 | 0.67 | $10^3$ ppm | 0.97 | 1.34 |
| 18 | 0.67 | $10^4$ ppm | 0.96 | 1.31 |
| 19 | 0.67 | $2 \times 10^4$ ppm | 0.91 | 1.25 |
|  | 1 | Not incorporated | 0.92 | 0.48 |

*Relative brightness: At an acceleration voltage of 20 kV and a current of 100 μA. Al/(Al + Ga) = 0.67, and brightness of a phosphor containing no Yb is taken as 1.

Examples 20~24

Phosphors were prepared by changing the Al/(Al+Ga) composition in the same way as in Examples 9 to 19, and Table 3 shows the emission characteristics of the phosphors. The amount of Yb was adjusted to 20 ppm in molar ratio to Y site. The phosphors had an average particle diameter of 11 to 12 μm.

TABLE 3

Comparison of emission characteristics $(Y_{1-x-y}Tb_xYb_y)_3(Al_{1-z}Ga_z)_5O_{12}$

| Example | Composition Al/(Al + Ga) | Yb concentration | Brightness maintenance factor | Relative brightness* |
|---|---|---|---|---|
|  | 0 | Not incorporated | 0.85 | 0.355 |
| 20 | 0 | 20 ppm | 0.87 | 0.371 |
|  | 0.40 | Not incorporated | 0.87 | 1.11 |
| 21 | 0.40 | 20 ppm | 0.89 | 1.14 |
|  | 0.57 | Not incorporated | 0.87 | 1.09 |
| 22 | 0.57 | 20 ppm | 0.91 | 1.11 |
|  | 0.63 | Not incorporated | 0.90 | 1.03 |
| 23 | 0.63 | 20 ppm | 0.94 | 1.10 |
|  | 0.67 | Not incorporated | 0.90 | 1 |
| 13 | 0.67 | 20 ppm | 0.92 | 1.10 |
|  | 0.74 | Not incorporated | 0.90 | 0.992 |
| 24 | 0.74 | 20 ppm | 0.93 | 1.05 |
|  | 1 | Not incorporated | 0.92 | 0.48 |
|  | 1 | 20 ppm | 0.94 | 0.53 |

*Relative brightness: At an acceleration voltage of 20 kV and a current of 100 μA. Al/(Al + Ga) = 0.67, and brightness of a phosphor containing no Yb is taken as 1.

Figure 3:
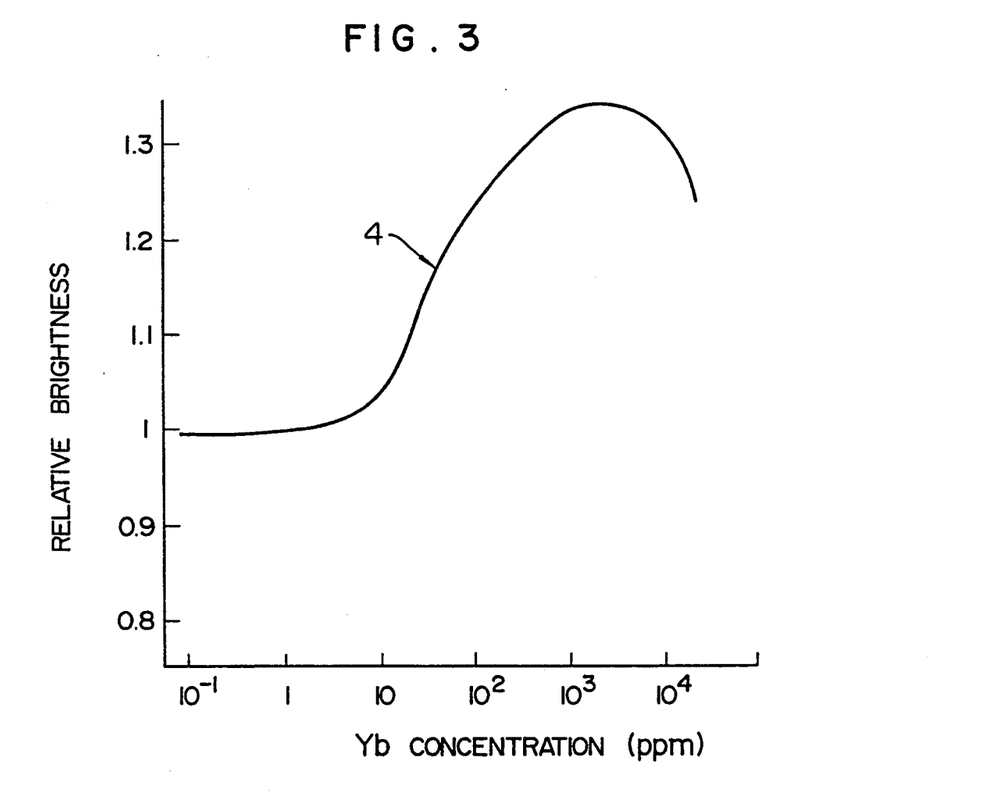
FIG. 3 shows dependence of a relative brightness of a $(Y_{1-x-y}Tb_xYb_y)_3(Al_{1-z}Ga_z)_5O_{12}$ phosphor [wherein Al/(Al×Ga) molar ratio=0.67] on Yb concentration.

Further, FIG. 3 shows a relationship between an amount of Yb and an emission output. As is clear from FIG. 3, it was possible to produce phosphors which have an effect on improvement of brightness and whose brightness deterioration hardly takes place, by adjusting the amount of Yb into the range of from 1 ppm to $2\times10^4$ ppm ($1\times10^{-6} \leq y \leq 2\times10^{-2}$) in molar ratio. The effect of incorporation of Yb is exhibited while the Al/(Al+Ga) composition is in the range of from 0 to 1, and in particular, the effect is greater in the compositional range of from 0.1 to 0.6.

Figure 4:
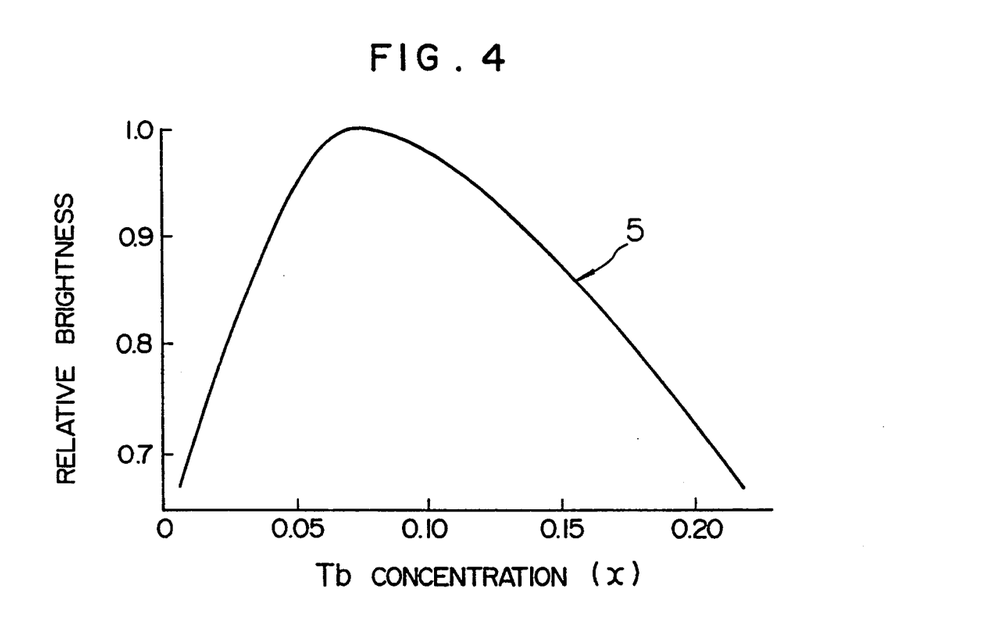
FIG. 4 shows dependence of relative brightness of a $(Y_{1-x-y}Tb_xYb_y)_3(Al_{1-z}Ga_z)_5O_{12}$ phosphor [wherein Al/(Al+Ga) molar ratio=0.60] on Tb concentration.

A brightness at a practically usable level can be obtained when the Tb concentration is in the range of from $10^4$ to $2\times10^5$ ppm ($1\times10^{-2} \leq x \leq 0.20$), and in particular, a good brightness can be obtained when the Tb concentration is in the range of $0.04 \leq x \leq 0.14$ (FIG. 4).

According to this Example, incorporation of Yb makes it possible to prevent brightness deterioration of a phosphor and improve brightness by more than about 30%.

Examples 25~31

$Sm_2(SO_4)_3$ or $Eu_2(SO_4)_3$ was used in place of $Yb_2(SO_4)_3$ used in Examples numbered up to Example 24, and the procedure of Examples 1 to 8 was repeated to synthesize phosphors. Further, concerning a mixture system of Yb, Sm and Eu, a phosphor was also synthesized to examine emission characteristics. The conditions for electron beam irradiation were the same as those described in Examples 1 to 8.

TABLE 4

Comparison of emission characteristics
of $(Y_{1-x-y}Tb_xM_y)_3(Al_{1-z}Ga_z)_5O_{12}$
Al/(Al + Ga) = 0.67 in all of the Example

| Example | Incorporated element | Amount | Brightness maintenance factor | Relative brightness* |
|---|---|---|---|---|
| 25 | Sm | 20 ppm | 0.96 | 1.07 |
| 26 | Eu | 20 ppm | 0.97 | 1.08 |
| 27 | Tm | 20 ppm | 0.95 | 1.06 |
| 28 | Sm + Eu | 20 + 20 ppm | 0.96 | 1.08 |
| 29 | Yb + Sm | 20 + 20 ppm | 0.96 | 1.08 |
| 30 | Yb + Eu | 20 + 20 ppm | 0.96 | 1.08 |
| 31 | Yb + Eu + Tm | 20 + 20 + 5 ppm | 0.96 | 1.08 |
| 32 | Sm + Tm | 20 + 20 ppm | 0.96 | 1.08 |
| — | Not incorporated | | 0.92 | 1 |

*Relative brightness: At an acceleration voltage of 20 kV and a current of 100 μA. Al/(Al + Ga) = 0.67, and brightness of a phosphor having no element incorporated is taken as 1.

According to these Examples, it can be also ascertained that incorporation of Sm, Eu or Tm into a phosphor prevents brightness deterioration of the phosphor and improves the brightness thereof. It has been also found that incorporation of a mixture of these rare earth elements has like effects.

Example 33

Figure 5:
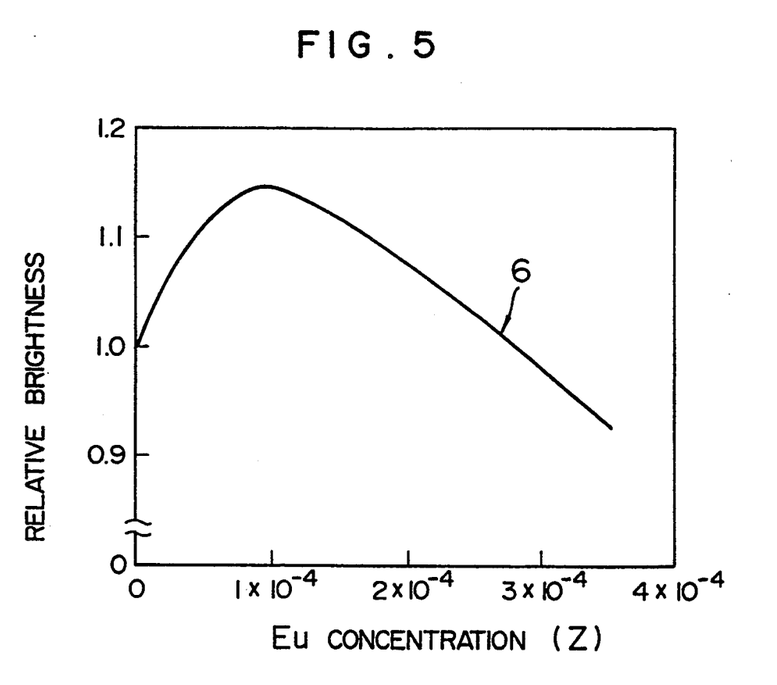
FIG. 5 shows dependence of relative brightness of a $(Y_{0.93-z}Tb_{0.07}Eu_z)_2SiO_5$ phosphor on Eu concentration (z).

An oxide powder represented by general formula of $(Y_{0.774-z}Gd_{0.186}Tb_{0.07}Eu_z)_2O_3$ ($1\times10^{-2}$ mole) was prepared, and $1\times10^{-2}$ mole of $SiO_2$ and $1.5\times10^{-3}$ mole of NaBr were added thereto. These components were well mixed in a mortar, and the mixture was charged in an alumina crucible and fired in an $N_2$ and $H_2$ mixed gas (5% of $H_2$) at 1,600° C. for 2 hours. The fired product was washed with water and dried at 120° C. to give a phosphor having a composition of $(Y_{0.744-z}Gd_{0.186}Tb_{0.07}Eu_z)_2SiO_5$. FIG. 5 shows dependence of relative brightness on an Eu concentration (z). The brightness of a sample wherein $z=1\times10^{-4}$ was improved by 15% as compared with a sample containing no Eu. Further, the sample wherein $z=1\times10^{-4}$ had a brightness maintenance factor of 0.99, while the sample containing no Eu had a brightness maintenance factor of 0.90.

In addition, in Examples including the following Examples, the conditions for measurement of brightness and brightness maintenance factor were the same as those described in Examples 1 to 8.

Example 34

An oxide powder represented by general formula of $(Y_{0.93(1-x)-z}Gd_{0.93x}Tb_{0.07}Eu_z)_2O_3$ ($1\times10^{-2}$ mole) wherein $z=1\times10^{-4}$ was prepared, and $1\times10^{-2}$ mole of $SiO_2$ and $1.5\times10^{-3}$ mole of NaBr were added thereto. Thereafter, the mixture was treated in the same way as in Example 33 to give a phosphor having a composition of $(Y_{0.93(1-x)-z}Gd_{0.93x}Tb_{0.07}Eu_z)_2SiO_5$ wherein $z=1\times10^{-4}$.

Figure 6:
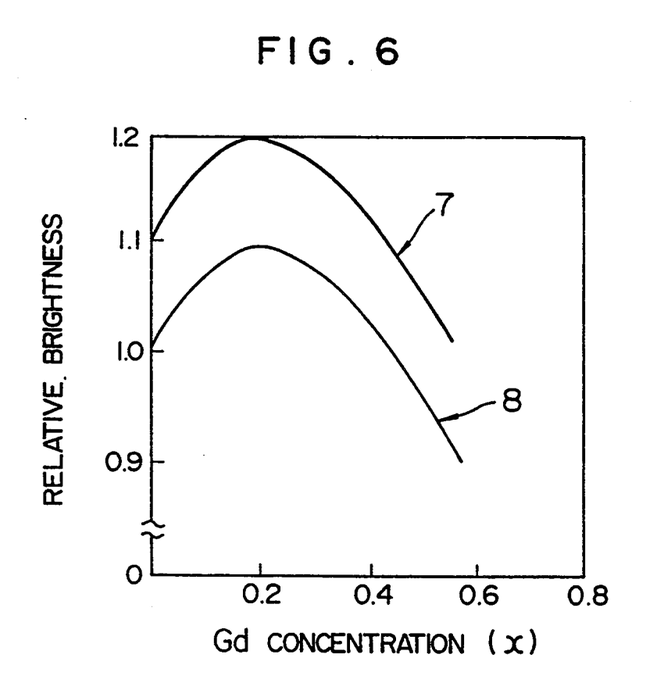
FIG. 6 shows dependence of relative brightness of a $(Y_{0.93(1-x)}Gd_{0.93x}Tb_{0.07}Eu_z)_2SiO_5$ phosphor [wherein z=0 (curve 8) and $1 \times 10^{-4}$ (curve 7) on Gd concentration (x).

As a reference, a sample of an x=0 series in the above general formula was synthesized in the same way as in Example 33. FIG. 6 shows relative brightnesses of the phosphors of the above two series to the brightness of a sample wherein x=z=0. Curve 8 indicates a brightness of a sample wherein z=0, and curve 7 indicates a brightness of a sample wherein $z=1\times10^{-4}$. The brightness was improved by about 10% by incorporation of Eu, and the brightness of the sample was improved by about 10% when a Gd substitution was effected by x=0.3.

The brightness maintenance factor was improved from 0.90 to a point between 0.95 and 0.98.

Example 35

An oxide powder represented by general formula of $(Y_{0.744-z}Gd_{0.186}Tb_{0.07}Yb_z)_2O_3$ ($1\times10^{-2}$ mole) wherein $z=1\times10^{-4}$ was prepared, and $1\times10^{-2}$ mole of $SiO_2$ and $1.5\times10^{-3}$ mole of NaBr were added thereto. Thereafter, the mixture was treated in the same way as in Example 33 to give a phosphor having a composition of $(Y_{0.774-z}Gd_{0.186}Tb_{0.07}Yb_z)_2SiO_5$. It was possible to improve brightness of the phosphor by 12% and the brightness maintenance factor thereof by 8% as compared with a sample containing no Yb.

Example 36

An oxide powder represented by general formula of $(Y_{0.93-z}Tb_{0.07}Eu_z)_2O_3$ ($1\times10^{-2}$ mole) wherein $z=1\times10^{-4}$ was prepared, and $1\times10^{-2}$ mole of $SiO_2$ and $1.5\times10^{-3}$ mole of NaBr were added thereto. Thereafter, the mixture was treated in the same way as in Example 33 to give a phosphor having a composition of $(Y_{0.93-z}Tb_{0.07}Eu_z)_2SiO_5$. It was possible to improve brightness of the phosphor by 13% and the brightness maintenance factor thereof by 8% as compared with a sample containing no Eu.

Example 37

Figure 7:
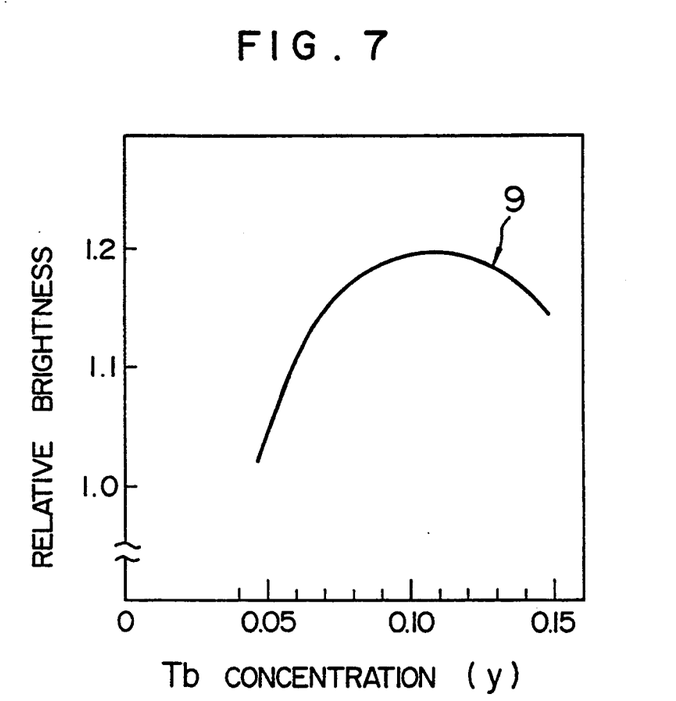
FIG. 7 shows dependence of relative brightness of a $(Y_{1-y-z}Tb_yEu_z)_2SiO_5$ phosphor (wherein $z=1 \times 10^{-4}$) on Tb concentration (y).

An oxide powder represented by general formula of $(Y_{1-y-z}Tb_yEu_z)_2O_3$ ($1\times10^{-2}$ mole) wherein $z=1\times10^{-4}$ was prepared, and $1\times10^{-2}$ mole of $SiO_2$ and $1.5\times10^{-3}$ mole of NaBr were added thereto. Thereafter, the mixture was treated in the same way as in Example 33 to give a phosphor having a composition of $(Y_{1-y-z}Tb_yEu_z)_2SiO_5$. FIG. 7 shows dependence of brightness on the Tb concentration. When y is 0.1, the maximum brightness is obtained. Further, it is seen that incorporation of Eu increases the brightness. The brightness maintenance factor was improved from 0.90 in case of no incorporation of Eu to a point between 0.93 and 0.99.

Example 38

An oxide powder represented by general formula of $(Y_{1-y-z}Tb_ySm_z)_2O_3$ ($1\times10^{-2}$ mole) wherein y=0.07 and $z=2\times10^{-4}$ was prepared, and $1\times10^{-2}$ mole of SiO$_2$ and $1.5\times10^{-3}$ mole of NaBr were added thereto. Thereafter, the mixture was treated in the same way as in Example 33 to give a phosphor having a composition of $(Y_{1-y-z}Tb_ySm_z)_2SiO_5$. The brightness maintenance factor thereof was improved from 0.90 in case of no incorporation of Sm to 0.95, and its brightness was improved by 10%.

Example 39

An oxide powder represented by general formula of $(Y_{1-y-z}Tb_yTm_z)_2O_3$ ($1\times10^{-2}$ mole) wherein $y=0.05$ and $z=2\times10^{-4}$ was prepared, and $1\times10^{-2}$ mole of SiO$_2$ and $1.5\times10^{-3}$ mole of NaBr were added thereto. Thereafter, the mixture was treated in the same way as in Example 33 to give a phosphor having a composition of $(Y_{1-y-z}Tb_yTm_z)_2SiO_5$. The brightness maintenance factor thereof was improved from 0.90 in case of no incorporation of Tm to 0.93, and its brightness was improved by 7%.

Example 40~48

An oxide powder represented by general formula of $(Y_{0.9-z}Tb_{0.1}Eu_z)_2O_3$ ($1\times10^{-2}$ mole) wherein $z=1\times10^{-4}$ was prepared, and $1\times10^{-2}$ mole of SiO$_2$ and $1.5\times10^{-3}$ mole of a flux represented by MX were added thereto. In this case, M represents Na, K, Rb or Cs, and X represents Cl, Br or I. Thereafter, the mixture was treated in the same way as in Example 33 to give a phosphor having a composition represented by general formula of $(Y_{0.9-z}Tb_{0.1}Eu_z)_2SiO_5$.

Table 5 shows kinds of fluxes and brightnesses of phosphors obtained in these Examples. The values for the brightnesses stand for those when the brightness of a sample using no flux is taken as 1. It is seen that incorporation of the fluxes improves the brightness by 7 to 13%.

TABLE 5

| Effect of incorporation of flux | | | | | |
|---|---|---|---|---|---|
| Example | Flux | Brightness | Example | Flux | Brightness |
| 40 | Not incorporated | 1.00 | 45 | NaCl | 1.09 |
| 41 | NaBr | 1.10 | 46 | KCl | 1.07 |
| 42 | KBr | 1.08 | 47 | RbCl | 1.09 |
| 43 | RbBr | 1.10 | 48 | NaI | 1.10 |
| 44 | CsBr | 1.13 | | | |

Example 49-53

In$_2$O$_3$ (4.476 g, 0.016 mole), 2.200 g (0.0088 mole) of H$_3$BO$_3$ and 0.15 mole %, based on the In$_2$O$_3$, of Tb$_4$O$_7$ were weighed out, and 1.68 ml of a nearly neutral aqueous solution containing 1 mg/ml of Yb was added to these components. Further, 3 ml of pure water was added thereto to render them slurry-like, and they were mixed. The mixture was dried at 140° C. for 3 hours, and then 0.20 g of Li$_2$B$_4$O$_7$ was added and mixed therewith in a mortar. The mixture was fired at 1,000° C. for 1 hour, and then the fired product was pulverized and mixed in a mortar. This product was further fired at 120° C. for 2 hours, cooled, and lightly pulverized in a mortar. Coarse particles were removed with a mesh, and the remaining product was washed with dilute nitric acid, washed with water, and then dried to give a phosphor represented by general formula of $(In_{0.997-y}Tb_{0.003}Yb_y)BO_3$ wherein $y=3\times10^{31\ 4}$.

Similarly, phosphor samples having a different Yb concentration were prepared by changing the amount of the above Yb-containing aqueous solution. Further, as a reference, a sample containing no Yb was synthesized. The relative brightnesses and brightness maintenance factors to those of the sample as a reference were measured under the same conditions described in Examples 1 to 8. Table 6 shows the results.

TABLE 6

| Characteristics of $(In_{0.997-y}Tb_{0.003}Yb_y)BO_3$ | | | |
|---|---|---|---|
| Example | Amount of incorporated Yb | Relative brightness* | Brightness maintenance factor |
| 49 | 5 ppm | 1.03 | 0.87 |
| 50 | 30 ppm | 1.07 | 0.90 |
| 51 | 70 ppm | 1.12 | 0.92 |
| 52 | 300 ppm | 1.12 | 0.88 |
| 53 | 1000 ppm | 1.03 | 0.88 |

Examples 54-58

A phosphor represented by the general formula of $(Y_{2.79-z}Tb_{0.21}Yb_z)(Al_{3.15}Ga_{1.85})O_{12}$ wherein $z=2\times10^{-5}$, was precipitation-applied on a 7-inch bulb so as to form a phosphor film having a thickness of 6 mg/cm$^2$, an electromagnetic focussing electron gun was fixed to the bulb, and the bulb was vacuum-sealed, whereby a liquid-cooled projection tube was formed. Further, for comparison, another projection tube was formed by repeating the above procedure but by using a $(Y_{2.79}Tb_{0.21})(Al_{3.15}Ga_{1.85})O_{12}$ phosphor containing no Yb.

The brightness, brightness maintenance factor and current coefficient of brightness ($\gamma$ value) of each of the above projection tubes were measured. Table 7 shows the results.

TABLE 7

| Example | z | Relative* brightness: | $\gamma$ Value <1 mA | $\gamma$ Value ≧1 mA |
|---|---|---|---|---|
| 54 | $1\times10^{-4}$ | 1.06 | 0.99 | 0.87 |
| 55 | $3\times10^{-4}$ | 1.05 | 1.00 | 0.89 |
| 56 | $5\times10^{-4}$ | 1.05 | 1.00 | 0.89 |
| 57 | $1\times10^{-3}$ | 1.05 | 1.00 | 0.89 |
| 58 | $3\times10^{-3}$ | 1.02 | 1.00 | 0.91 |

*An average of values at a current of 5~7 mA. In addition, the absolute value of brightness was $1\times10^5$ cd/m$^2$.

Example 59

The phosphor obtained in Example 33, $(Y_{0.744-z}Gd_{0.186}Tb_{0.07}Eu_z)_2SiO_5$, was precipitation-applied on a 7-inch bulb so as to form a phosphor film having a thickness of 6 mg/cm$^2$, an electromagnetic focussing electron gun was fixed to the bulb, and the bulb was vacuum-sealed, whereby a projection tube was formed. Further, for comparison, another projection tube was formed by repeating the above procedure but by using a $(Y_{0.744}Gd_{0.186}Tb_{0.07})_5$ phosphor containing no Eu.

Figure 8:
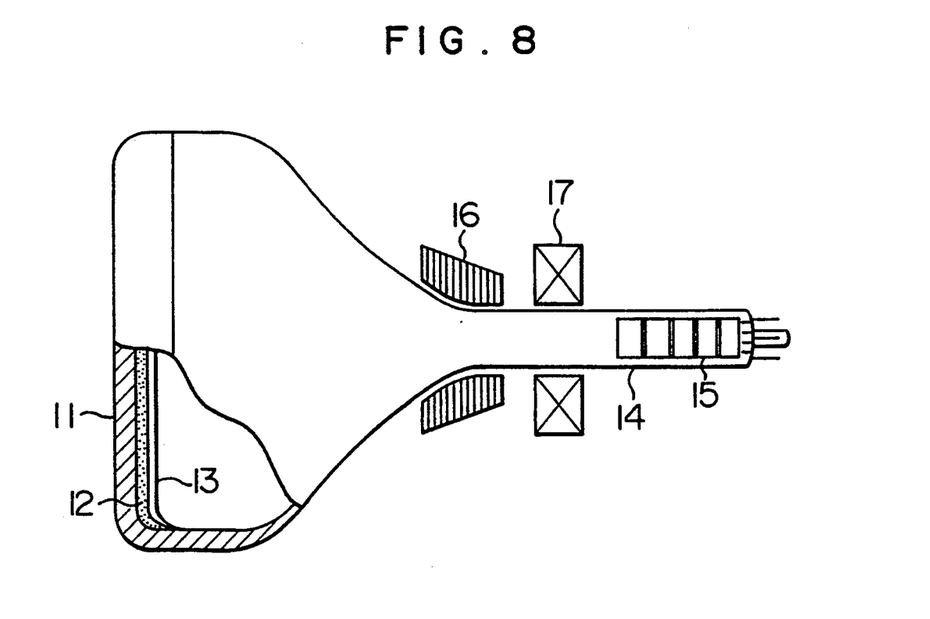
FIG. 8 is a schematic view showing projection cathode-ray tube to which said phosphor is applied.

FIG. 8 shows a schematic view of across section of the projection tube. The above phosphor film, indicated by numeral 12, is formed on a faceplate 11. An electron gun 15 in a neck tube 14 emits electron beams, and the electron beams are deflected by a deflection yoke 16 so as to correspond to scanning lines and focussed with a focussing coil 17. Then, the electron beams move through an aluminum deposition film 13 to excite the phosphor film. The diameters of electron beam spots are generally from 0.3 to 0.6 mm, although they differ depending upon places and electric current values.

The brightness, brightness maintenance factor and current coefficient of brightness (γ value) of each of the above projection tubes were measured. Table 8 shows the results.

TABLE 8

| | Characteristics of a projection tube using $(Y_{0.744-z}Gd_{0.186}Tb_{0.07}Eu_z)_2SiO_5$ | | |
|---|---|---|---|
| Example | z | Relative brightness | Brightness maintenance factor | γ value |
| 59 | $1 \times 10^{-4}$ | 1.15 | 0.91 | 0.98 |
| | 0 | 1.00 | 0.74 | 0.98 |

The method for measurement of brightness maintenance factor of projection tubes is as follows.

A phosphor film was irradiated with electron beams under conditions that an acceleration voltage was 30 kV, a cathode electric current was 0.55 mA, a raster size was 5 inches and an irradiation time was 2,000 hours, and a value of brightness after the irradiation is shown as a relative value to brightness before the irradiation.

Further, the above current coefficient (γ) values show values while the cathode electric current was between 0.2 and 1 mA.

As is clear in Table 8, the brightness and brightness maintenance factor of the $(Y_{0.744-z}Gd_{0.186}Tb_{0.07}Eu_z)_2SiO_5$ phosphor of this invention are improved as compared with that containing no Eu.

According to this invention, all of colorings have been in the range of $0.325 \leq X \leq 0.36$ and $0.54 \leq Y \leq 0.625$ in chromaticity coordinates. And this invention makes it possible to reduce brightness deterioration under high-density electron bombardment, and further makes it possible to decrease brightness saturation and increase brightness in high electric current region by several to several tens in percentage. Therefore, this invention is useful for achievement of high brightness of a display device of a large screen and high resolution.

What is claimed is:

1. A green-emitting phosphor having a composition of:

$$(Y_{1-x-y-z}Gd_zTb_xYb_y)_2SiO_5$$

in which $0.05 \leq x \leq 0.15$, $1 \times 10^{-6} \leq y \leq 2 \times 10^{-2}$ and $0 \leq z \leq 0.45$, wherein the green-emitting phosphor emits colors in the range of $0.325 \leq X \leq 0.36$ and $0.54 \leq Y \leq 0.65$ in emission chromaticity coordinates.

2. A green-emitting phosphor having a composition of:

$$(Y_{1-x-y-z}Gd_zTb_xM_y)_2SiO_5$$

in which $0.05 \leq x \leq 0.15$, $1 \times 10^{-6} \leq y \leq 1 \times 10^{-3}$, $0 \leq z \leq 0.45$, and M is at least one element selected from the group consisting of thulium and samarium, wherein the green-emitting phosphor emits colors in the range of $0.325 \leq X \leq 0.36$ and $0.54 \leq Y \leq 0.625$ in emission chromaticity coordinates.

3. A cathode-ray tube comprising:
a faceplate;
a phosphor film formed on a surface of the faceplate which emits colors in the range of $0.325 \leq X \leq 0.36$ and $0.54 \leq Y \leq 0.625$ in emission chromaticity coordinates, the phosphor having a composition of $$(Y_{1-x-y-z}Gd_zTb_xYb_y)_2SiO_5$$

in which $0.05 \leq x \leq 0.15$, $1 \times 10^{-6} \leq y \leq 2 \times 10^{-2}$ and $0 \leq z \leq 0.45$;
an aluminum deposition film formed on the oxide phosphor film;
an electron gun to irradiate the oxide phosphor film with electron beams; and
means of allowing the electron beams to scan on the faceplate.

4. A cathode-ray tube comprising:
a faceplate;
a phosphor film formed on a surface of the faceplate which emits colors in the range of $0.325 \leq X \leq 0.36$ and $0.54 \leq Y \leq 0.625$ in emission chromaticity coordinates, the phosphor having a composition of $$(Y_{1-x-y-z}Gd_zTb_xM_y)_2SiO_5$$

in which $0.05 \leq x \leq 0.15$, $1 \times 10^{-6} \leq y \leq 1 \times 10^{-3}$, $0 \leq z \leq 0.45$, and M is at least one element selected from the group consisting of thulium and samarium;
an aluminum deposition film formed on the oxide phosphor film;
an electron gun to irradiate the oxide phosphor film with electron beams; and
means of allowing the electron beams to scan on the faceplate.

* * * * *